United States Patent
Bezugly et al.

[15] 3,686,559
[45] Aug. 22, 1972

[54] MONITOR OF SERIES-CONNECTED RECTIFIERS IN HIGH-VOLTAGE CONVERTER UNIT

[72] Inventors: Stanislav Leontievich Bezugly, ulitsa Dudykina, 70, kv. 64; Mikhail Andreevich Sidorsky, Dnepropetrovskoe Shosse, 58, kv. 59; Vladimir Petrovich Kotlyar, ulitsa Silovaya, 19, kv., all of Zaporozhie, U.S.S.R.

[22] Filed: Aug. 10, 1971

[21] Appl. No.: 170,507

[52] U.S. Cl. .................... 321/8 R, 321/27 R, 321/11
[51] Int. Cl. .............................................. H02m 7/00
[58] Field of Search ...... 174/142, 143; 321/8, 27, 11, 321/12; 323/93; 324/119; 340/253 E

[56] References Cited

UNITED STATES PATENTS 3,287,576  11/1966  Motto, Jr. ............. 321/11 UX
3,564,386  2/1971  Leonard ...................... 321/8

Primary Examiner—William M. Shoop, Jr.
Attorney—Eric H. Waters et al.

[57] ABSTRACT

A monitor or series-connected rectifiers incorporated in a high-voltage converter unit, according to the invention, is characterized in that high voltage is supplied to the rectifiers through a high-voltage capacitor bushing fitted with an instrument lead, and the indicator checking the state of the rectifiers is connected between said instrument lead and the terminal lead of an R-C circuit shorting out the main rectifier potentially coupled with the converter unit housing; another capacitor being inserted between said instrument lead and the converter unit housing.

1 Claim, 1 Drawing Figure

Patented Aug. 22, 1972 3,686,559
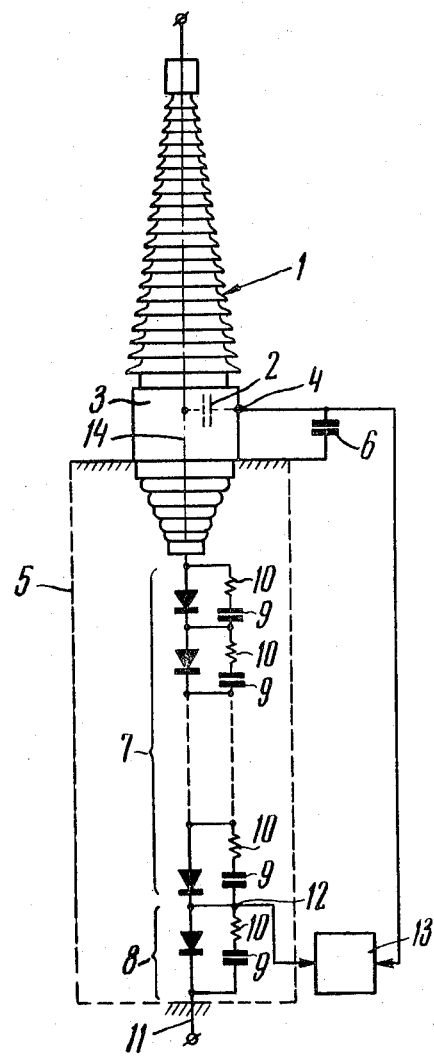

MONITOR OF SERIES-CONNECTED RECTIFIERS IN HIGH-VOLTAGE CONVERTER UNIT

The present invention relates to monitoring the state of rectifiers and, more particularly, to a monitor of series-connected rectifiers incorporated in a high-voltage converter unit.

Known in the art is a number of arrangements for monitoring the state of series-connected rectifiers used in converter units.

There is known, for example, such an arrangement in which the state of rectifiers shorted out by R-C circuits is monitored by means of ohmic voltage dividers made up of resistors, the resistors of one of the voltage dividers being parallel-connected to each rectifier while the other voltage divider is connected across all the series connected rectifiers.

The state of rectifiers in such an arrangement is checked by an indicator inserted between said voltage dividers.

It is a rather complicated problem to connect such voltage dividers, especially in high-voltage converter units.

Besides, a divider composed of separate elements (resistors), is not so reliable as there is a danger of breakdown of its elements which may cause malfunctioning of the indicator.

There is also known a similar arrangement in which ohmic voltage dividers are replaced by a high-voltage transformer, one of whose windings is connected across all the series-connected rectifiers and in series with the indicator while the other windings are connected in parallel to each rectifier.

Such an arrangement, however, is of no use for superhigh-voltage converter units because of difficulties connected with transformer insulation suitable for such purposes. Besides, the size of arrangements using these transformers is too large and their sensitivity is reduced due to the increased dimension of the core causing an increase of leakage loss.

There is known, too, an arrangement using a combination of a voltage divider made up of separate resistors connected in parallel to each rectifier and a high-voltage transformer one of whose windings is connected across all the series-connected rectifiers while the other winding is connected in parallel across one of said resistors; the indicator is this arrangement is connected to a separate winding of said transformer.

All these disadvantages are likewise characteristic of this arrangement.

It is the main object of this invention to provide an arrangement for monitoring the state of series-connected rectifiers incorporated in a high-voltage converter unit characterized in a simple circuitry and suitable for use in high-voltage and superhigh-voltage converter units to be mounted both indoors and in outdoor substations.

It is another object of this invention to provide an arrangement dispensing with auxiliary equipment placed at high voltages.

The objects set up herein have been achieved by developing a monitor of series-connected rectifiers in a high-voltage converter unit, in which high voltage supply to the rectifiers is effected according to the invention through a high-voltage capacitor bushing fitted with an instrument lead while the rectifier state indicator is connected between the instrument lead of said capacitor bushing and the terminal lead of one of the R-C circuits shorting out the rectifier potentially coupled with the converter unit housing, another capacitor being inserted between the converter unit housing and said instrument lead of the capacitor bushing.

The arrangement set up according to this invention, has made it possible to eliminate the above-mentioned drawbacks as it can dispense with auxiliary voltage dividers, their function being fulfilled by a high-voltage bushing which is an integral part of the converter unit.

This invention will be better understood from the following detailed description of an embodiment of this invention with reference to the accompanying drawing which illustrates the schematic diagram of the monitoring arrangement of this invention.

As is shown in the drawing, the monitor of series-connected rectifiers incorporated in a high-voltage converter unit consists of a high-voltage capacitor bushing 1 through which high-voltage supply is brought into the converter unit and which is an integral part of the unit ensuring insulation of the unit grounded housing from the high-voltage source; a capacitor 2 incorporated in the capacitor bushing 1 and connected via a flange 3 to an instrument lead 4; a capacitor 6 is inserted between the instrument lead 4 and the converter unit housing 5.

The main power circuit of the converter unit employs series-connected rectifiers 7 and 8 with R-C circuits made up of capacitors 9 and resistors 10 put in parallel with said rectifiers.

The main rectifier 8 is put in series with the rectifiers 7 and in point 11 it is grounded through the housing 5 of the converter unit. The capacitors 2 and 6 are connected in parallel to the rectifiers 7 and 8 of the converter unit.

In this way there is obtained an unbalanced bridge circuit consisting of two high-voltage arms (the capacitor 2 and the rectifiers 7) and two low-voltage arms (the capacitor 6 and the main rectifier 8. An indicator 13 checking the state of the rectifiers is connected across said bridge circuit, viz, between the instrument lead 4 and the point 12 which is the terminal lead of the R-C circuit shorting out the main rectifier 8.

The voltage of the converter unit is equally shared between all the series-connected rectifiers 7 and 8.

The capacitors 6 and 9 are selected of such a magnitude that in the absence of punctured rectifiers the voltage is equally shared between them. In this case the indicator 13 is connected between equal-potential points. The required potential difference across the indicator 13 can be set by varying the magnitude of the capacitors 6 and 9.

In the course of operation, if one or more rectifiers 7 and 8 break down, the faulty rectifiers short out the respective R-C circuits causing an increase in the voltage of the remaining R-C circuits of good rectifiers, including that of the main rectifier 8, and hence, of the capacitor 9 and its R-C circuit. The capacitor 6 voltage does not change as said capacitor is connected in conjunction with the capacitor 2 in parallel with all the rectifiers of the unit whose voltage does not vary with a failure of separate rectifiers. The capacitors 6 and 9 are now at different voltages, and this difference actuates the indicator 13.

The above cited example, however, is only mentioned as a preferred type of this arrangement. There may be used many other available types such as monitors in which the function of the capacitor 2 of the high-voltage bushing 1 is fulfilled by the own capacitance of the flange 3 of the bushing 1 through the current-conducting rod 4. In this case, the flange 3 is connected with the housing 5 of the converter unit through a light insulation and the capacitor 6 is connected to the flange 3 and to the converter unit housing 5.

Specific terms used in the description of a particular embodiment of the invention thereof illustrated by the accompanying drawing must not be understood as an absolute sense and it should be borne in mind that each term covers all similar elements depending for their operation on the same principles and serving the same purposes as the invention thereof.

What is claimed is:

1. A monitor of series-connected rectifiers incorporated in a high-voltage converter unit comprising: R-C circuits the number of which is equal to that of series-connected rectifiers, each of said R-C circuits being parallel connected to one of the rectifiers; a high-voltage capacitor bushing fitted with an instrument lead and designed to pass high voltage to said rectifiers of the converter unit; an indicator checking the state of said rectifiers and inserted between said instrument lead of the capacitor bushing the terminal lead of one of said R-C circuits shorting out the rectifier potentially coupled with the unit housing; a capacitor inserted between said unit housing and the instrument lead of the capacitor bushing.

* * * * *